(12) United States Patent
Ferré Fàbregas et al.

(10) Patent No.: US 11,117,532 B2
(45) Date of Patent: Sep. 14, 2021

(54) ELECTRICAL ASSEMBLY AND METHOD

(71) Applicant: Lear Corporation, Southfield, MI (US)

(72) Inventors: Antoni Ferré Fàbregas, Valls (ES); Carlos Fernández Pueyo, Valls (ES); Jose Gabriel Fernández Bañares, Valls (ES); Ramon Serret, Valls (ES); Anton Nin Nin, Valls (ES)

(73) Assignee: Lear Corporation, Southfield, MI (US)

( * ) Notice: Subject to any disclaimer, the term of this patent is extended or adjusted under 35 U.S.C. 154(b) by 117 days.

(21) Appl. No.: 16/393,527

(22) Filed: Apr. 24, 2019

(65) Prior Publication Data

US 2020/0339048 A1 Oct. 29, 2020

(51) Int. Cl.
*B60R 16/023* (2006.01)
*B60R 16/033* (2006.01)
*H02J 1/10* (2006.01)
*G05D 1/02* (2020.01)

(52) U.S. Cl.
CPC ........ *B60R 16/0232* (2013.01); *B60R 16/033* (2013.01); *H02J 1/10* (2013.01); *G05D 1/02* (2013.01)

(58) Field of Classification Search
CPC ...... B60R 16/0232; B60R 16/033; H02J 1/10; G05D 1/02
USPC .......................................... 307/10.1, 10.6, 66
See application file for complete search history.

(56) References Cited

U.S. PATENT DOCUMENTS

| 6,084,382 | A | 7/2000 | Hite | |
|---|---|---|---|---|
| 6,747,369 | B2 | 6/2004 | Griffith et al. | |
| 7,464,292 | B2 | 12/2008 | Zansky et al. | |
| 7,567,060 | B1 * | 7/2009 | Atcitty | H02S 50/00 320/116 |
| 9,855,856 | B2 * | 1/2018 | Patana | B60L 11/1877 |
| 2011/0111268 | A1 * | 5/2011 | Weng | H01M 10/441 429/50 |
| 2019/0334375 | A1 * | 10/2019 | Wataru | G01R 31/40 |
| 2020/0001807 | A1 * | 1/2020 | Pighi | H02J 7/0045 |
| 2020/0017042 | A1 * | 1/2020 | Boesch | B60L 58/10 |
| 2020/0018796 | A1 * | 1/2020 | Conell | G01R 31/3277 |
| 2020/0070661 | A1 * | 3/2020 | Akuzawa | B60L 3/0076 |

FOREIGN PATENT DOCUMENTS

| CN | 102355044 A | 2/2012 |
|---|---|---|
| CN | 103227503 A | 7/2013 |
| CN | 106026374 A | 10/2016 |
| RU | 2335055 C1 | 9/2008 |
| WO | 2017113338 A1 | 7/2017 |

* cited by examiner

*Primary Examiner* — Michael R. Fin
(74) *Attorney, Agent, or Firm* — Fishman Stewart PLLC (57) ABSTRACT

An electrical assembly includes a first battery, a second battery, a third battery, and/or a switch assembly. The switch assembly may be configured to selectively connect at least two of the first battery, the second battery, and the third battery to one or more loads. The switch assembly may include an electronic control unit (ECU) configured to control the switch assembly. The ECU may be configured to selectively open one or more switches of the switch assembly and disconnect a corresponding battery of the first battery, the second battery, and the third battery from the one or more loads to test the one or more switches and the corresponding battery.

20 Claims, 7 Drawing Sheets

ELECTRICAL ASSEMBLY AND METHOD

TECHNICAL FIELD

The present disclosure generally relates to electrical assemblies, including electrical assemblies that may be used in connection with vehicles, such as autonomous vehicles or highly-connected vehicles, and/or that may be configured for testing power supply systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex and/or may not provide sufficient functionality. Some electrical assemblies may not be configured for selectively testing the functionality of switches and/or power supplies.

There is a desire for solutions/options that minimize or eliminate one or more challenges or shortcomings of electrical assemblies. The foregoing discussion is intended only to illustrate examples of the present field and should not be taken as a disavowal of scope.

SUMMARY

In embodiments, an electrical assembly may include a first battery, a second battery, a third battery, and/or a switch assembly. The switch assembly may be configured to selectively connect at least two of the first battery, the second battery, and the third battery to one or more loads. The switch assembly may include an electronic control unit (ECU) configured to control the switch assembly. The ECU may be configured to selectively open one or more switches of the switch assembly and disconnect a corresponding battery of the first battery, the second battery, and the third battery from the one or more loads to test the one or more switches and the corresponding battery. The ECU may be configured to control the switch assembly such that at least two of the first battery, the second battery, and the third battery are connected to the one or more loads at substantially all times. The ECU may be configured to receive and transmit information about a status of the switch assembly.

With embodiments, a switch assembly may include a first switch, a second switch, a third switch, and a fourth switch. The first switch may be connected to the first battery, the second switch may be connected to the second battery, and/or the third switch and the fourth switch may be connected to the third battery. The ECU may be configured to control the first switch, the second switch, the third switch, and/or the fourth switch. The first switch may be configured to selectively connect the first battery to a first load and a second load of the one or more loads. The second switch may be configured to selectively connect the second battery to the first load and the second load. The third switch may be configured to selectively connect the third battery to the first load and the second load. The fourth switch may be configured to selectively connect the third battery to the first load and the second load. The ECU may be configured to test at least one of the first switch, the second switch, the third switch, and the fourth switch while at least two of the first battery, the second battery, and the third battery are connected to both of a first load and a second load of the one or more loads.

In embodiments, the electrical assembly may include a first state configured for testing a first switch of the switch assembly, a second state configured for testing a second switch of the switch assembly, and/or a third state for testing either or both of a third switch and a fourth switch of the switch assembly. The third state may correspond to normal operation. The one or more loads may include an electric motor of a vehicle. The second battery may include a different voltage than the first battery. A vehicle may include an electrical assembly and the one or more loads. The one or more loads may include two redundant loads. A first load and a second load of the one or more loads may be configured as highly automated driving (HAD) loads.

With embodiments, a method of operating an electrical assembly may include providing a first battery, a second battery, and/or a third battery; providing a switch assembly including a first switch, a second switch, a third switch, and/or a fourth switch; providing one or more loads; providing power from at least two of the first battery, the second battery, and the third battery to the one or more loads; and/or selectively opening and closing the first switch, the second switch, the third switch, and the fourth switch, while providing power to the one or more loads, to test the first switch, the second switch, the third switch, the fourth switch, the first battery, the second battery, and/or the third battery. At least two of the first battery, the second battery, and the third battery may be connected to each of the one or more loads during the selectively opening and closing. Selectively opening and closing the first switch, the second switch, the third switch, and the fourth switch may include opening the first switch to disconnect the first battery from the one or more loads; closing the third switch and/or the fourth switch to connect the third battery to the one or more loads; and/or testing the first switch to determine a status of the first switch. Selectively opening and closing the first switch, the second switch, the third switch, and the fourth switch may include opening the second switch to disconnect the second battery from the one or more loads; closing the third switch and/or the fourth switch to connect the third battery to the one or more loads; and/or testing the second switch to determine a status of the second switch. Selectively opening and closing the first switch, the second switch, the third switch, and the fourth switch may include opening the third switch and/or the fourth switch; closing the first switch and the second switch to connect the first battery and the second battery to the one or more loads; and/or testing the third switch and/or the fourth switch to determine a status of the third switch and/or the fourth switch.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
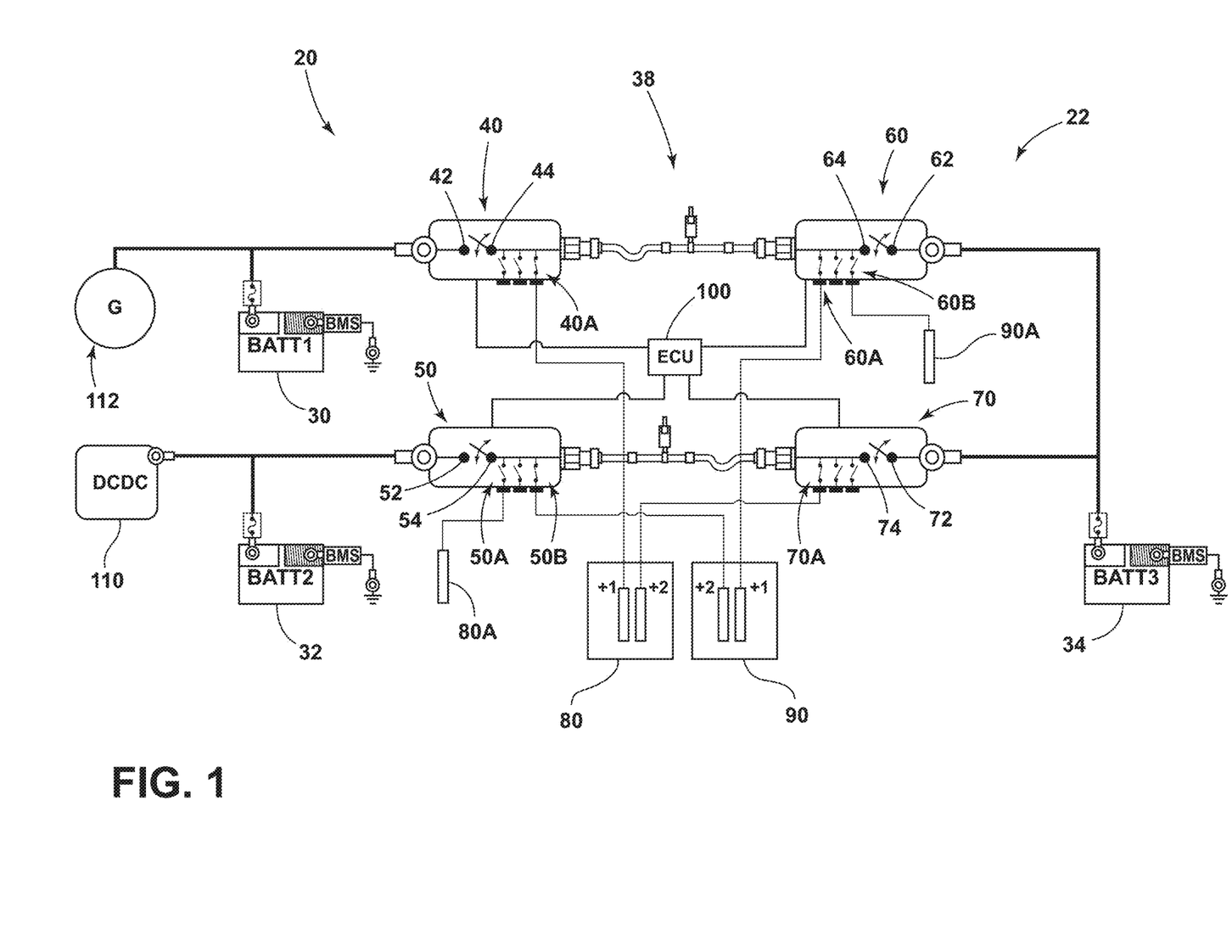
FIG. 1 is a schematic generally illustrating an embodiment of an electrical assembly according to teachings of the present disclosure.

In embodiments, such as generally illustrated in FIG. 1, an electrical assembly 20 may include one or more power sources 30, 32, 34 (e.g., lead-acid batteries, lithium-ion batteries, etc.), and/or one or more switches 40, 50, 60, 70 (e.g., relays, contactors, transistors, MOSFETS, solid state switches, etc.). The electrical assembly 20 may, for example and without limitation, be connected to and/or included with a vehicle 22 (e.g., electric, non-electric, hybrid, etc.). The power sources 30, 32, 34 may be configured as batteries and may be referred to herein as batteries 30, 32, 34, but are not limited to batteries. The electrical assembly 20 may include and/or be configured for connection with one or more electrical loads 80, 80A, 90, 90A. A load (e.g., loads 80, 90) may be configured as a safety-load that may be important and/or critical for operation of the vehicle 22, such as, for example and without limitation, one or more driving motors of a vehicle 22. The electrical loads 80, 90 may include a high level of functional safety and/or the electrical assembly 20 may be configured to provide the loads 80, 90 with supply redundancy. For example, the one or more loads 80, 90 (e.g., electric driving motors) of a vehicle 22 may be redundantly supplied at substantially all times while the vehicle 22 is operated. One or more electrical loads 80, 90 may provide the redundant functionality (e.g., the same or substantially the same function as the other load). For example and without limitation, the loads 80, 90 may be redundant loads and the electrical assembly 20 may provide each with a redundant supply. The electrical assembly 20 may be connected to and/or incorporated with a vehicle 22, which may be fully or partially electric (e.g., hybrid or full electric). The vehicle 22 may be configured for partial and/or full autonomous driving. The switches 40, 50, 60, 70 may be configured to selectively connect the one or more power sources 30, 32, 34 to provide power to the one or more electrical loads 80, 90 (e.g., the electric vehicle motors). One or more of the switches 40, 50, 60, 70 may include and/or be connected to one or more secondary switches (e.g., secondary switches 40A, 50A, 50B, 60A, 60B, 70A) that may be configured to switch the electrical loads 80, 80A, 90, 90A on and/or off. The electrical assembly 20 may include an electronic control unit (ECU) 100 that may be configured to control operation of at least some of the one or more switches 40, 50, 60, 70.

With embodiments, the ECU 100 may be configured to check or test the functionality of the batteries 30, 32, 34 and/or the connection of the batteries 30, 32, 34 to the one or more loads 80, 90. The ECU may be configured to verify that the batteries 30, 32, 34 are adequately and/or properly charged, such as via a converter 110 and/or a generator 112. If one or more batteries 30, 32, 34 fails, malfunctions, and/or becomes disconnected, the electrical assembly 20 may be configured to connect to one or more of the other batteries 30, 32, 34 to the one or more loads 80, 90. The one or more batteries 30, 32, 34 may be configured to perform to provide sufficient power for full vehicle operation and control (e.g., propulsion, maneuvering, and/or braking).

In embodiments, the ECU 100 may be configured to monitor (e.g., test, identify, etc.) the status and/or functionality of the switches 40, 50, 60, 70 that may be connected to the batteries 30, 32, 34. The ECU 100 may be configured to periodically determine whether the switches 40, 50, 60, 70 connected to the batteries 30, 32, 34 are functioning properly. The ECU 100 may be configured to monitor the status and/or functionality of other components (e.g., such as wiring and/or connectors) in and/or connected to the electrical assembly.

With embodiments, the ECU 100 may be configured to disconnect faulty batteries while maintaining connection of at least two other batteries with the loads 80, 90. The electrical assembly 20 may be configured to connect at least two of the batteries 30, 32, 34 to each of the first load 80 and the second load 90 at substantially all times.

With embodiments, such as generally illustrated in FIG. 1, an electrical assembly 20 may include a first battery 30, a second battery 32, and/or a third battery 34. The batteries 30, 32, 34 may be configured provide power for a vehicle 22 (e.g., an autonomous vehicle that may be configured for highly automated driving or HAD). At least two of the first battery 30, the second battery 32, and/or the third battery 34 may be electrically connected to the loads 80, 90 at all times, at least during normal/intended operation. The one or more switches 40, 50, 60, 70 may be configured for connecting and/or disconnecting the first battery 30, the second battery 32, and/or the third battery 34 from a first load 80 and/or a second load 90. The ECU 100 may be configured to isolate a battery 30, 32, 34 from the rest of the electrical assembly 20 and/or from the loads 80, 90, such as if a battery failure (or other failure between the loads 80, 80A, 90, 90A and the batteries 30, 32, 34) is detected. Upon detecting a single battery failure, the ECU 100 may control the switches 40, 50, 60, 70 to provide power from the remining two batteries 30, 32, 34 to the loads 80, 90.

In embodiments, the batteries 30, 32, 34 may be connected to any number of loads, such as loads that may be used for highly-autonomous vehicles. For example and without limitation, the batteries 30, 32, 34 may be connected to a first load 80 and/or a second load 90. The first load 80 may be configured to drive one or more wheels of a vehicle 22 and/or the second load 90 may be configured to drive one or more other wheels of the vehicle 22. Additionally or alternatively, the loads 80, 90 may be configured as redundant HAD loads. The electrical assembly 20 may include loads 80A, 90A that may be non-HAD loads and that may be disconnected from the electrical assembly 20 in the event of a malfunction (e.g., to isolate the malfunctioning load from the system). The ECU 100 may be configured to selectively turn on and/off the loads 80A, 90A, and/or cause the loads 80A, 90A to operate in low-power modes to reduce the overall quiescent current.

With embodiments, such as generally illustrated in FIG. 1, the electrical assembly 20 may include a first switch 40, a second switch 50, a third switch 60, and/or a fourth switch 70. The first switch 40 may include a first contact 42 and/or a second contact 44. The first contact 42 may be connected to the first battery 30. The second contact 44 may be connected to the first load 80 and/or connected to the second load 90 (e.g., via the third switch 60). The second switch 50 may include a first contact 52 and/or a second contact 54. The first contact 52 may be connected to the second battery 32. The second contact 54 may be connected to the second load 90 and/or connected to the first load 80 (e.g., via the fourth switch 70). The third switch 60 may include a first contact 62 and/or a second contact 64. The first contact 62 may be connected to the third battery 34. The second contact 64 may be connected to the second load 90 and/or connected to the first load 80 (e.g., via the first switch 40). The fourth switch 70 may include a first contact 72 and/or a second contact 74. The first contact 72 may be connected to the third battery 34. The second contact 74 may be connected to the first load 80 and/or connected to the second load 90 (e.g., via the third switch 60). The first contact 62 of the third switch 60, the first contact 72 of the fourth switch 70, and the third battery 34 may all be connected such that the third battery 34 may be connected to the first load 80 and/or the second load 90. The second contact 44 of the first switch 40 may be electrical connected with the second contact 64 of the third switch 60, and/or the second contact 54 of the second switch 50 may be electrically connected with the second contact 74 of the fourth switch 70.

In embodiments, such as generally illustrated in FIG. 1, the electrical assembly 20 may be configured to electrically connect at least two batteries 30, 32, 34 to each of the first load 80 and/or the second load 90. The switches 40, 50, 60, 70 may connect at least two of the first battery 30, the second battery 32, and/or the third battery 34 to each of the first load 80 and/or the second load 90. For example and without limitation, the switches 40, 50, 60, 70 may be configured to connect at least two batteries 30, 32, 34 to each of the first load 80 and the second load 90 at all times. The first switch 40 may selectively connect the first battery 30 to the first load 80 and/or the second load 90, and/or the second switch 50 may selectively connect the second battery 32 to the first load 80 and/or second load 90. The third switch 60 and/or the fourth switch 70 may selectively connect the third battery 34 to the first load 80 and/or the second load 90.

With embodiments, the ECU 100 may be configured to test the operation and/or functionality of connecting the batteries 30, 32, 34 to loads 80, 90. The functionality of the batteries 30, 32, 34 may be verified in real-time by one or more battery monitoring system/sensor (BMS) devices, and/or opening one of the switches 40, 50, 60, 70 may provide a time period with open voltage to perform specific testing. The ECU 100 may be configured to test the functionality (e.g., latent failures) of the first switch 40, the second switch 50, the third switch 60, and/or the fourth switch 70 while at least two batteries 30, 32, 34 are electrically connected to the first load 80 and the second load 90. The functionality of the switches 40, 50, 60, 70 may be tested by operation (e.g., by attempting to actuate the switch) to disconnect and/or connect the batteries 30, 32, 34 while the vehicle 22 is operating and/or when charging the batteries 30, 32, 34. The ECU 100 may test the switches 40, 50, 60, 70 by measuring the voltage difference between two contacts and/or a specific signal may be generated at a first contact and the same signal verified at a second contact. The electrical assembly 20 may include a first state, a second state, and/or a third state that may correspond to an open and/or closed combination of the first switch 40, the second switch 50, the third switch 60, and/or the fourth switch 70. For example and without limitation, the electrical assembly 20 may test the functionality/operation of the first switch 40 (e.g., disconnecting and/or reconnecting the first battery 30) while the third switch 60 may connect the third battery 34 to the first load 80 and/or the second load 90. The electrical assembly 20 may test the functionality/operation of the second switch 50 (e.g., disconnecting and/or reconnecting the second battery 32) while the fourth switch 70 may connect the third battery 34 to the first load 80 and/or the second load 90. The electrical assembly 20 may test the functionality/operation of the third switch 60 (e.g., disconnecting and/or reconnecting the third battery 34) while the first switch 40 may connect the first battery 30 to the first load 80 and/or the second load. The electrical assembly 20 may test the functionality/operation of the fourth switch 70 (e.g., disconnecting and/or reconnecting the third battery 34) while the second switch 50 may connect the second battery 32 to the first load and/or the second load 90.

In embodiments, the electrical assembly may include an electronic control unit (ECU) 100. The ECU 100 may be connected to the first switch 40, the second switch 50, the third switch 60, and/or the fourth switch 70. The ECU 100 may be configured to control the operation of the first switch 40, the second switch 50, the third switch 60, and/or the fourth switch 70. The ECU 100 may be configured to receive and/or transmit information about the functionality/operation of the first switch 40, the second switch 50, the third switch 60, and/or the fourth switch 70. For example and without limitation, the ECU 100 may detect a failure in the first battery 30 and/or the first switch 40, and/or the ECU 100 may open the first switch 40 and/or close the third switch 60 (e.g., the ECU 100 may disconnect the first battery 30 from the first load 80 and/or the second load 90 and connect the third battery 34 to the first load 80 and/or the second load 90). The ECU 100 may detect a failure in the second battery 32 and/or the second switch 50, and/or the ECU 100 may open the second switch 50 and/or close the fourth switch 70 (e.g., the ECU 100 may disconnect the second battery 32 from the first load 80 and/or the second load 90 and connect the third battery 34 to the first load 80 and/or the second load 90. The ECU 100 may detect a failure in the third battery 34, the third switch 60, and/or the fourth switch 70, and/or the ECU 100 may open the third switch 60 and/or the fourth switch 70, and the ECU 100 may close the first switch 40 and/or the second switch 50. The ECU 100 may electrically disconnect the third battery 34 from the vehicle 22 and the ECU 100 may connect the first battery 30 and the second battery 32 to the vehicle 22.

Figure 2:
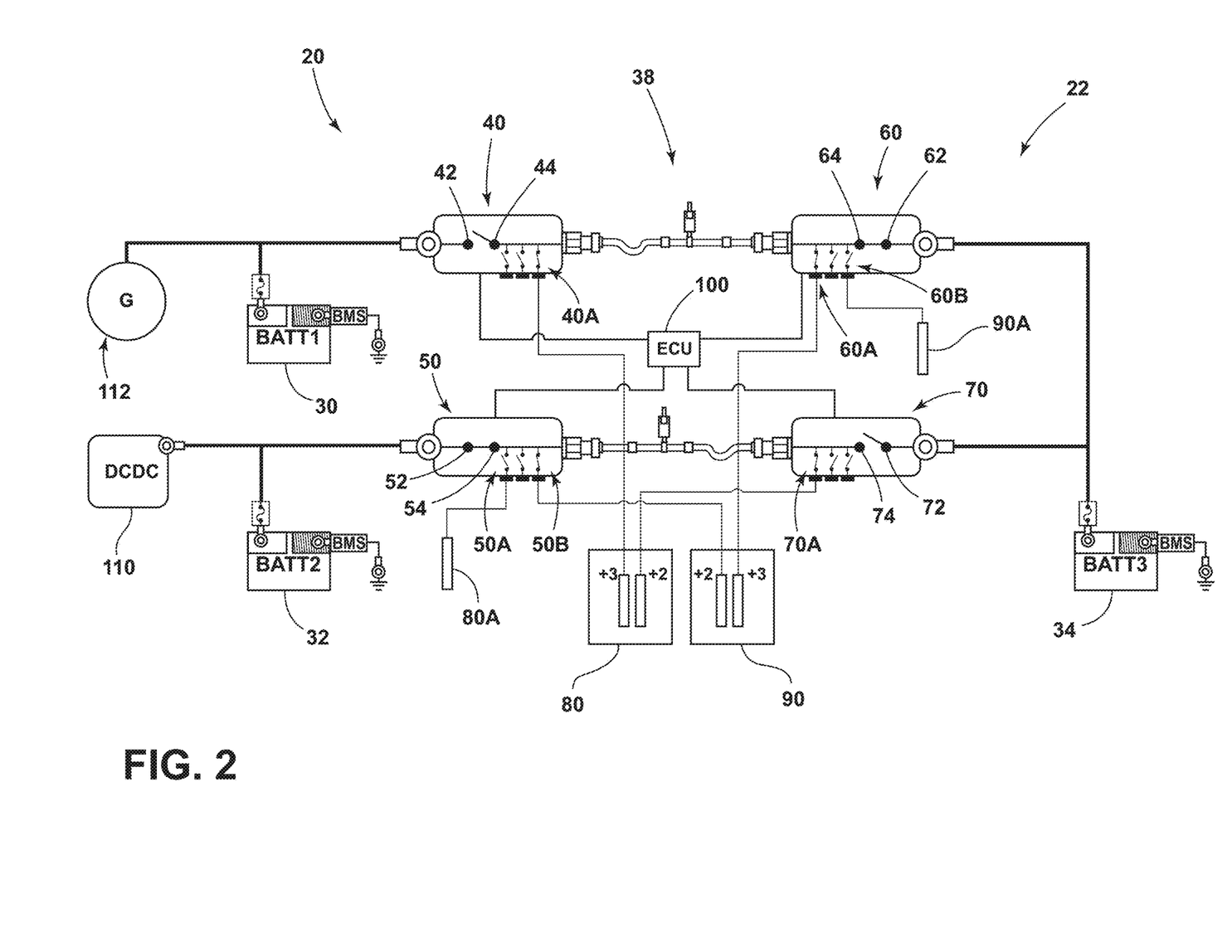
FIG. 2 is a schematic generally illustrating an embodiment of an electrical assembly according to teachings of the present disclosure.

In embodiments, such as generally illustrated in FIG. 2, the electrical assembly 20 may have a first state. When the electrical assembly 20 is in the first state, the functionality/operation of the first switch 40 and/or the first battery 30 may be tested. In the first state, the second switch 50 may be closed, and/or the second switch 50 may electrically connect the second battery 32 to the first load 80 and/or the second load 90. The third switch 60 may be closed, and/or the third switch 60 may connect the third battery 34 to the first load 80 and/or the second load 90. The first switch 40 may be opened and/or closed without materially affecting the supply of power to the loads 80, 90, as the loads 80, 90 may remain electrically connected to at least the second battery 32 and the third battery 34 via the second switch 50 and/or the third switch 60. When the electrical assembly 20 is in the first state, the fourth switch 70 may be open such that the third battery 34 may be connected to the first load 80 and/or the second load 90 via the third switch 60 and not the fourth switch 70. In the first state, the functionality/operation of the first switch 40 and/or the first battery 30 may be determined/tested without compromising the safety of the electrical assembly 20 (e.g., while maintaining the redundant supply to the loads 80, 90). For example and without limitation, the ECU 100 may open and/or close the first switch 40 one or more times to determine if the first switch 40 and/or the first battery 30 is working properly.

Figure 3:
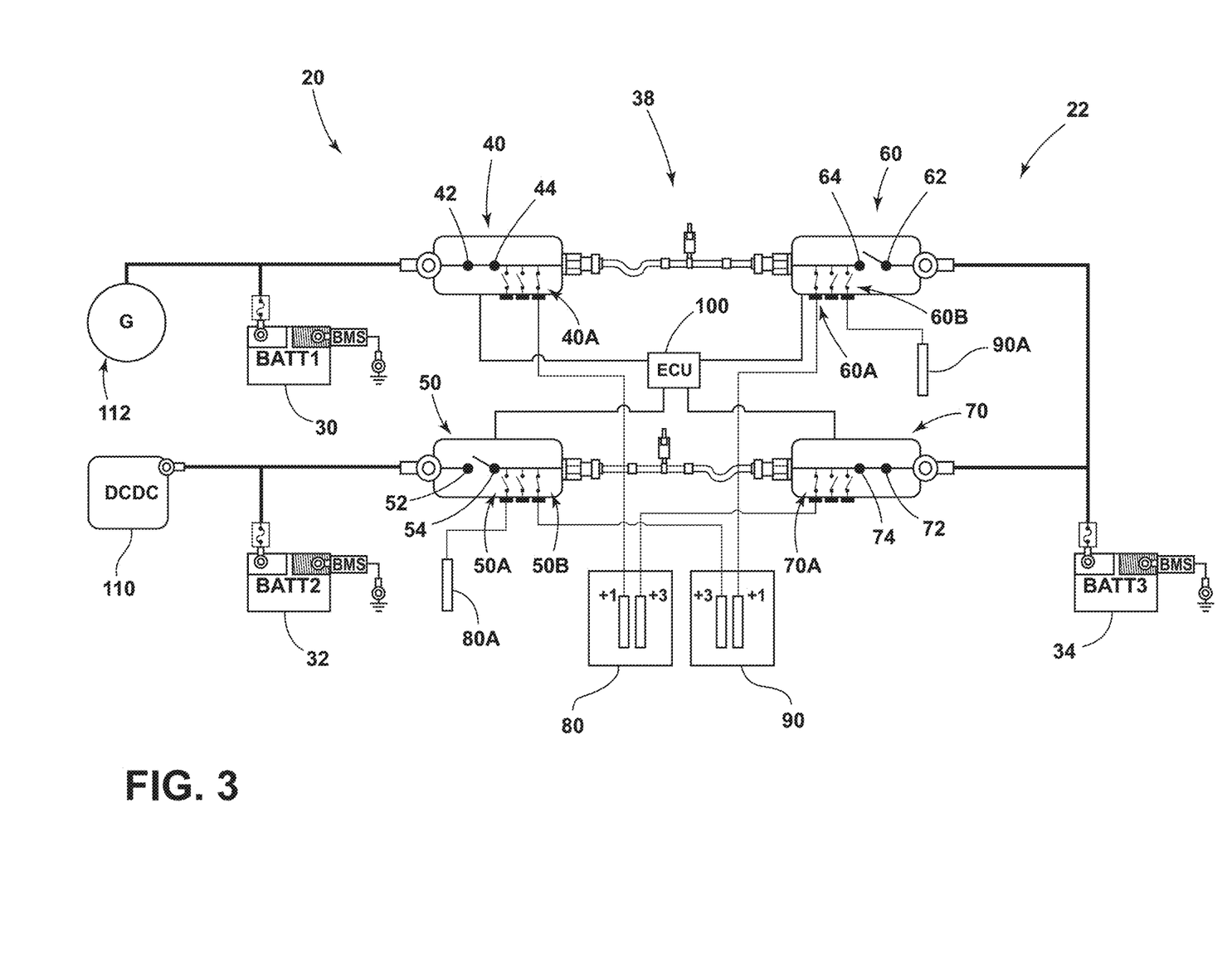
FIG. 3 is a schematic generally illustrating an embodiment of an electrical assembly according to teachings of the present disclosure.

With embodiments, such as generally illustrated in FIG. 3, the electrical assembly 20 may have a second state. When the electrical assembly 20 is in the second state, the functionality/operation of the second switch 50 and/or the second battery 32 may be tested. The first switch 40 may be closed, and/or the first switch 40 may electrically connect the first battery 30 to the first load 80 and/or the second load 90. In the second state, the fourth switch 70 may be closed, and/or the fourth switch 70 may electrically connect the third battery 34 to the first load 80 and/or the second load 90. When the electrical assembly 20 is in the second state, the third switch 60 may be open such that the third battery 34 be connected to the loads 80, 90 via the fourth switch 70 and not the third switch 60. The second switch 50 may be opened and/or closed without materially affecting the supply of power to the loads 80, 90, as the loads 80, 90 may remain electrically connected to at least the first battery 30 and the third battery 34 via the first switch 40 and/or the fourth switch 70.

In the second state, the functionality/operation of the second switch 50 and/or the second battery 32 may be determined/tested without compromising the safety of the electrical assembly 20 (e.g., while maintaining the redundant supply to the loads 80, 90). For example and without limitation, the ECU 100 may open and/or close the second switch 50 one or more times to determine if the second switch 50 and/or the second battery 32 is working properly.

Figure 4:
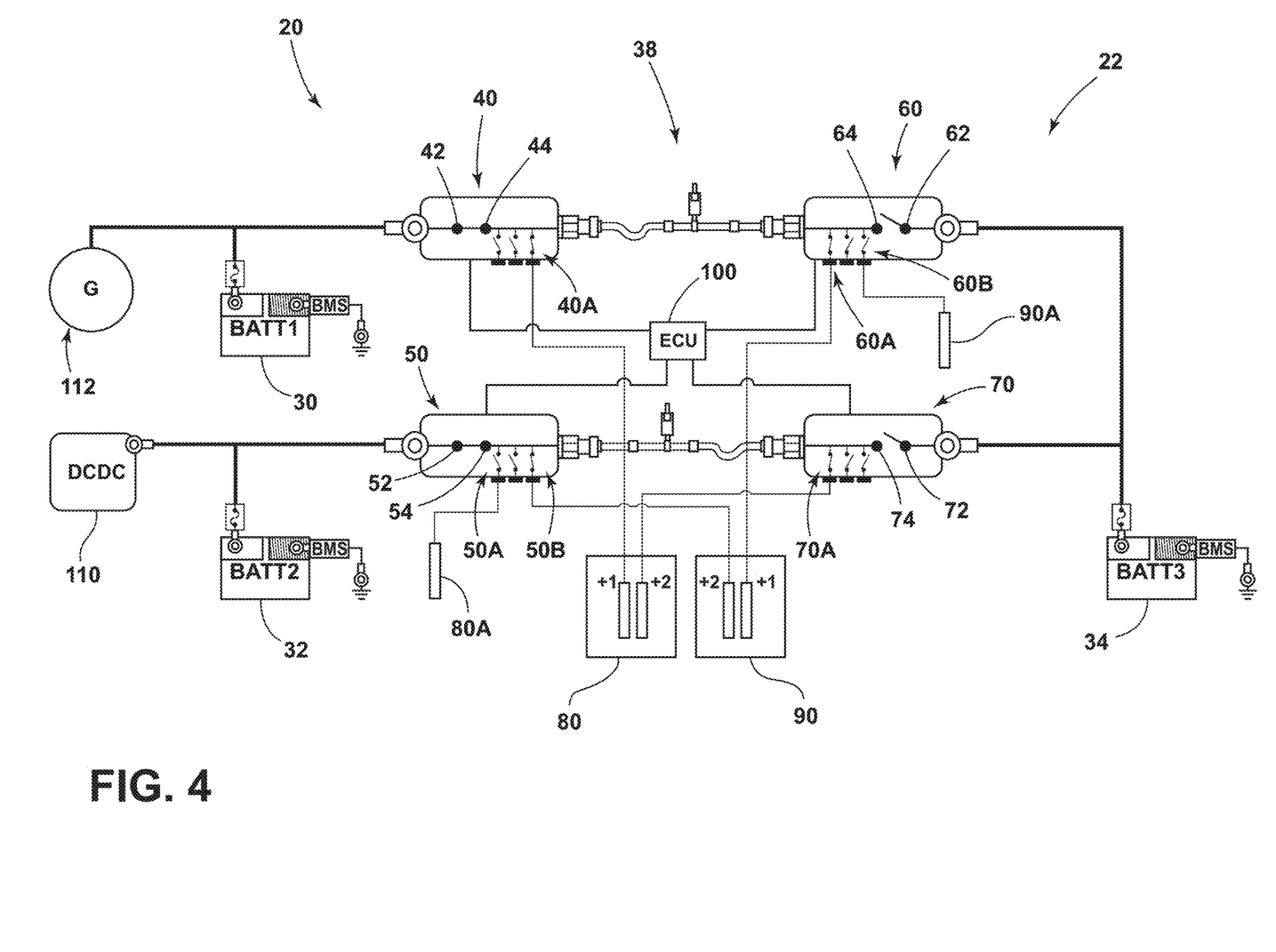
FIG. 4 is a schematic generally illustrating an embodiment of an electrical assembly according to teachings of the present disclosure.
Figure 5:
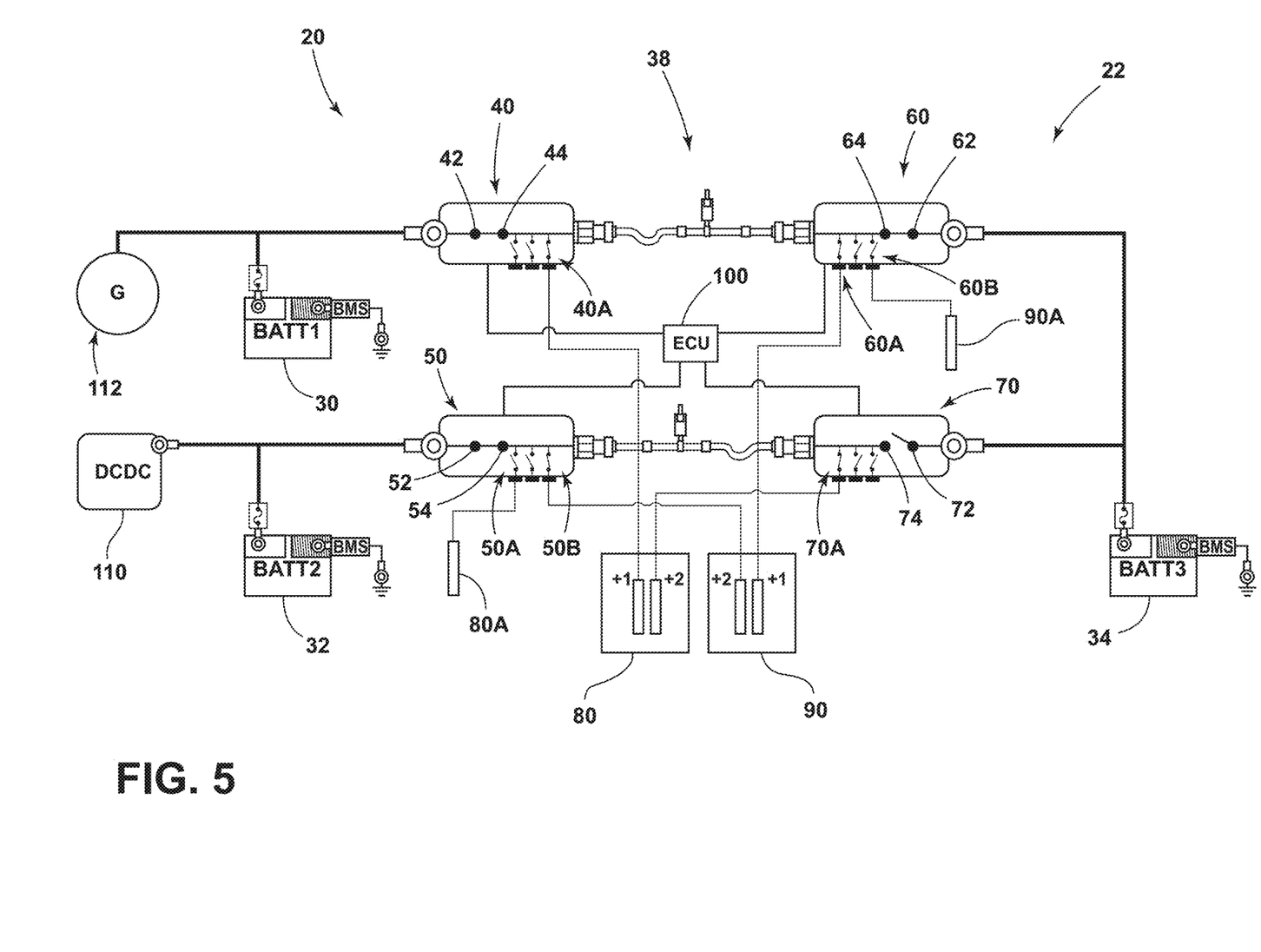
FIG. 5 is a schematic generally illustrating an embodiment of an electrical assembly according to teachings of the present disclosure.
Figure 6:
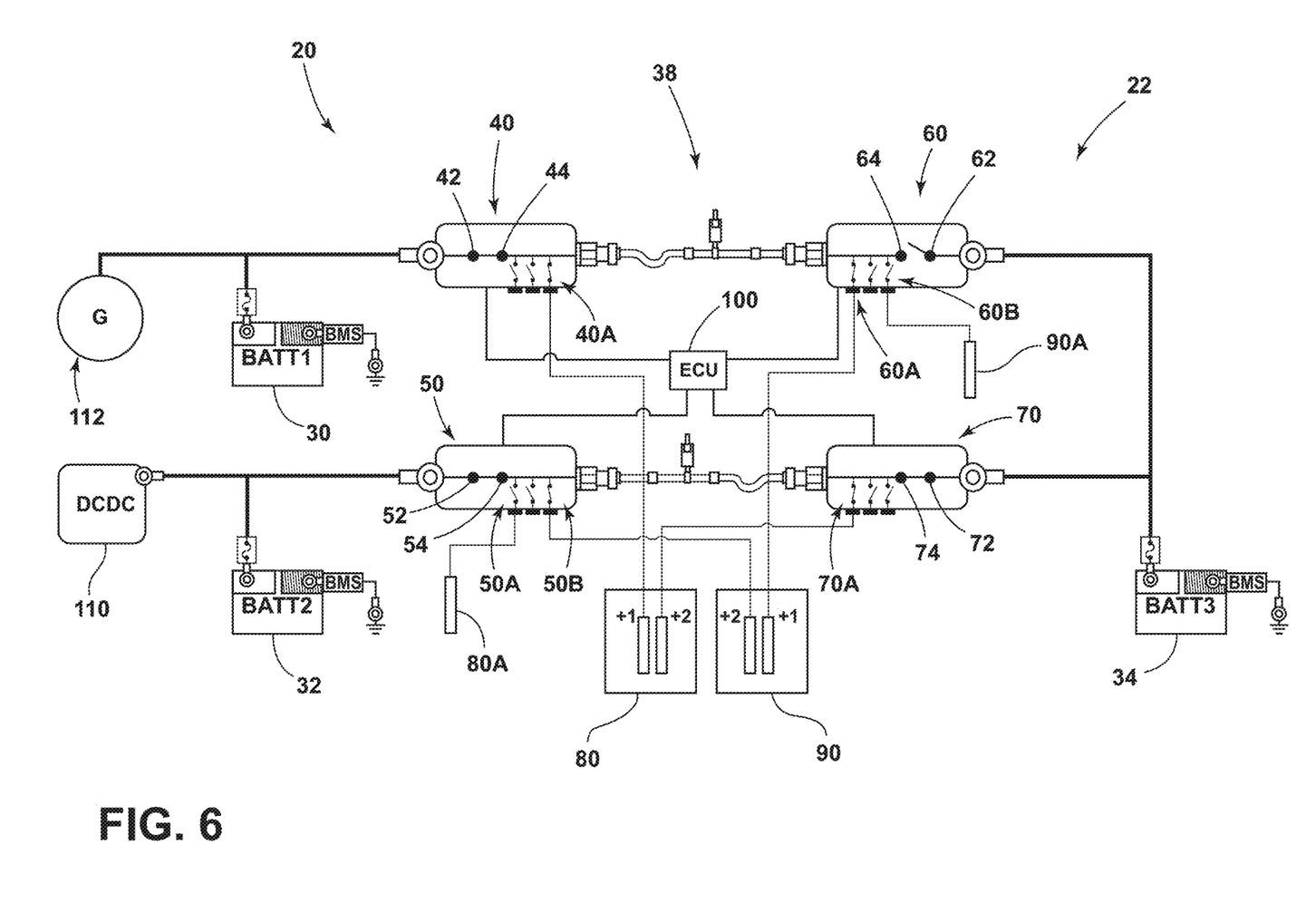
FIG. 6 is a schematic generally illustrating an embodiment of an electrical assembly according to teachings of the present disclosure.

In embodiments, such as generally illustrated in FIGS. 4, 5 and 6, the electrical assembly 20 may include a third state that may correspond to normal operation. When the electrical assembly 20 is in the third state, the functionality/operation of the third switch 60 and/or the fourth switch 70 may be tested. The third switch 60 and/or the fourth switch 70 may be opened and/or closed without interfering with the first battery 30 and/or the second battery 32, such that the first load 80 and the second load 90 may be electrically connected to the first battery 30 and the second battery 32 regardless of the open/closed status of the third switch 60 or the fourth switch 70. In the third state, the first switch 40 may be closed, and/or the first switch 40 may electrically connect the first battery 30 to the first load 80 and/or the second load 90. Additionally or alternatively, when the electrical assembly 20 is in the third state, the second switch 50 may be closed, and/or the second switch 50 may electrically connect the second battery 32 to the first load 80 and/or the second load 90. In the third state, such as generally illustrated in FIGS. 4-6, both of the first battery 30 and the second battery 32 may be connected to each of the first load 80 and the second load 90 (e.g., such that either or both of the third switch 60 and the fourth switch 70 may be tested while maintaining the redundant supply to the loads 80, 90).

With embodiments, such as generally illustrated in FIG. 5, the functionality/operation of the third switch 60 may be tested in the third state of the electrical assembly 20. The third switch 60 may be opened and/or closed while the fourth switch 70 may be open when the electrical assembly 20 is in the third state without materially affecting the supply of power to the first load 80 or the second load 90. For example and without limitation, in the third state, the first battery 30 may be electrically connected to the first load 80 and the second load 90, and the second battery 32 may be electrically connected to the first load 80 and the second load 90, so closing and/or opening the third switch 60 may not disconnect either of the first battery 30 or the second battery 32 from either of the loads 80, 90.

In embodiments, such as generally illustrated in FIG. 6, the functionality/operation of the fourth switch 70 may be tested in the third state of the electrical assembly 20. The fourth switch 70 may be opened and/or closed while the third switch 60 may be open when the electrical assembly 20 is in the third state without materially affecting the supply of power to the first load 80 or the second load 90. For example and without limitation, in the third state, the first battery 30 may be electrically connected to the first load 80 and the second load 90, and the second battery 32 may be electrically connected to the first load 80 and the second load 90, so closing and/or opening the fourth switch 70 may not disconnect either of the first battery 30 or the second battery 32 from either of the loads 80, 90.

Figure 7:
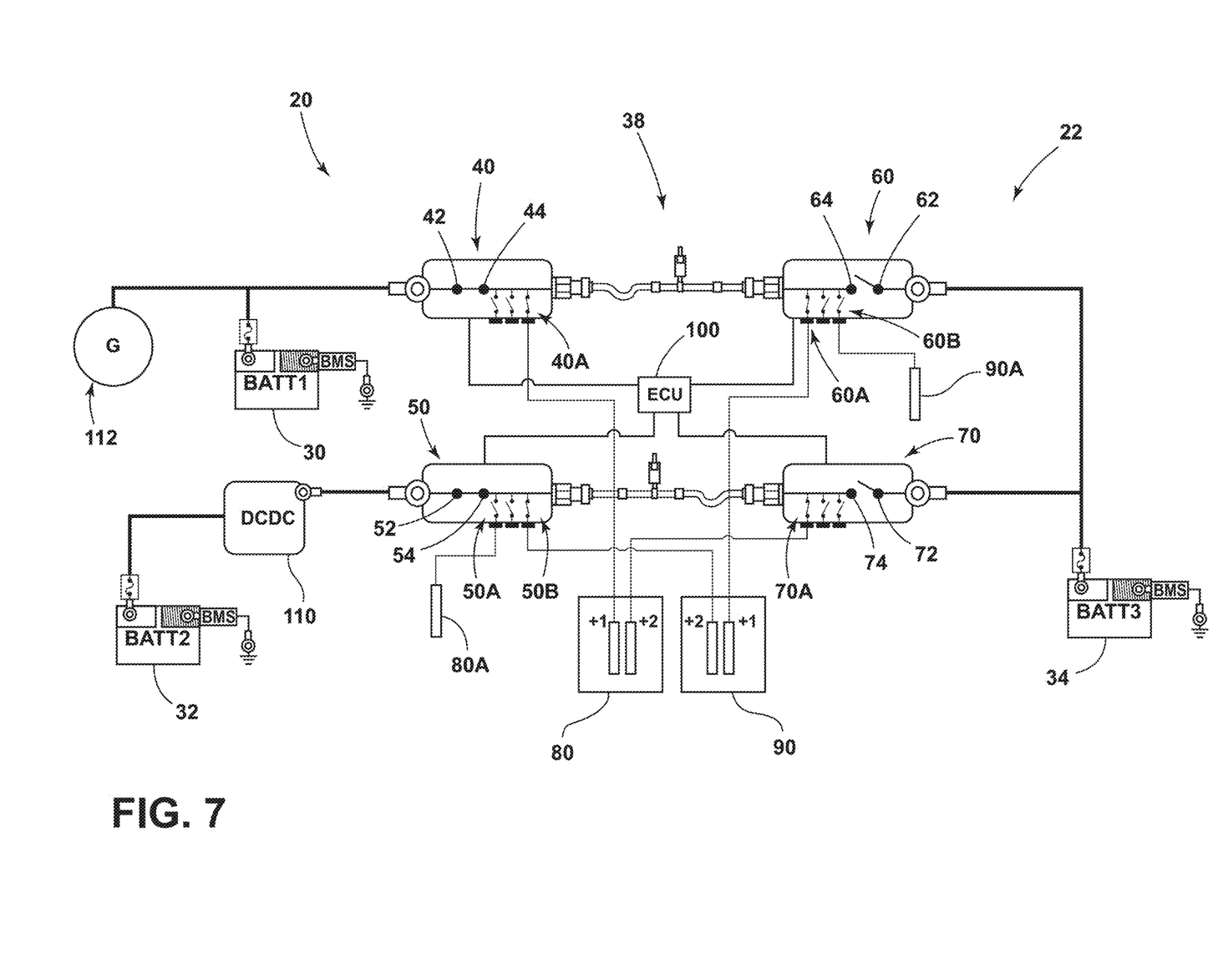
FIG. 7 is a schematic generally illustrating an embodiment of an electrical assembly according to teachings of the present disclosure.

With embodiments, such as generally illustrated in FIG. 7, the electrical assembly 20 may include a converter 110 that may be connected to a battery (e.g., the second battery 32). The converter 110 may be a DC/DC converter that may increase or decrease the voltage of the second battery 32 (e.g., at the first contact 52 of the second switch 50). The resulting voltage at the second switch 50 may be substantially the same as voltages at the first switch 40, the third switch 60, and/or the fourth switch 70. In embodiments, one or more of the batteries 30, 32, 34 may provide a voltage different from at least one other battery. For example and without limitation, the voltage of the second battery 32 may include, but is not be limited to, 24V, 48V, or larger voltages (e.g., hundreds of volts), or smaller voltages.

In embodiments, a method of operating an electrical assembly 20 may include providing a first battery 30, a second battery 32, and/or a third battery 34. The method may include providing a first switch 40, a second switch 50, a third switch 60, and/or a fourth switch 70. The method may include providing a first load 80 and/or a second load 90. The method may include selectively opening and/or closing the first switch 40, the second switch 50, the third switch 60, and/or the fourth switch 70 wherein at least two of the batteries 30, 32, 34 may be connected to the first load 80 and/or the second load 90 at all or substantially all times. The method may include opening the first switch 40 to disconnect the first battery 30 from the first load 80 and the second load 90, connecting the third battery 34 to the first load 80 and the second load 90, testing the first switch 40, and/or transmitting a status of the first switch 40 to an ECU 100 (see, e.g., FIG. 2). The method may include opening the second switch 50 to disconnect the second battery 32 from the first load 80 and the second load 90, connecting the third battery 34 to the first load 80 and the second load 90, testing the second switch 50, and/or transmitting a status of the second switch 50 to an ECU 100 (see, e.g., FIG. 3). The method may include opening either or both of the third switch 60 and the fourth switch 70, connecting the first battery 30 to the first load 80 and the second load 90, connecting the second battery 32 to the first load 80 and the second load 90, testing the third switch 60 and/or the fourth switch 70, the and/or and transmitting a status of the third switch 60 and/or the fourth switch 70 to an ECU 100 (see, e.g., FIGS. 4-6).

Embodiments of an electrical assembly 20 may include fewer power sources/batteries and/or fewer switches than other designs. For example and without limitation, the electrical assembly 20 may provide redundancy for two batteries (e.g., the first and second batteries 30, 32) with one battery (e.g., the third battery 34).

In embodiments, the ECU 100 may be configured to automatically (e.g., without user intervention) test switches 40, 50, 60, 70 of the switch assembly 38, the batteries 30, 32, 34 and/or other wiring/connector elements contained within and/or connected to the electrical assembly 20. If a switch 40, 50, 60, 70 or a battery 30, 32, 34 connected thereto fails a test (e.g., malfunctions, becomes disconnected, etc.), the ECU 100 may be configured to automatically disconnect the malfunctioning section of the electrical assembly 20. The tests may be conducted in real-time without materially affecting power provided to the loads 80, 90. For example and without limitation, in the event a component fails a test, the ECU 100 may be configured to automatically and/or immediately disconnect that component and connect a backup or redundant component to maintain providing power to the loads 80, 90.

Embodiments of an electrical assembly 20 may be compatible with Levels 1-5 HAD, and/or may comply with ASIL D metrics, for example and without limitation.

In embodiments, a controller may include an electronic control unit (ECU) 100 and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that a controller (e.g., controller), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, including:
an electronic control unit (ECU);
a first battery;
a second battery;
a third battery; and
a switch assembly;
wherein the switch assembly is configured to selectively connect at least two of the first battery, the second battery, and the third battery to one or more loads;
wherein the ECU is configured to control the switch assembly such that at least two of the first battery, the second battery, and the third battery are connected to the one or more loads at substantially all times;
wherein the switch assembly includes a first switch, a second switch, a third switch, and a fourth switch; and
wherein the first switch is configured to selectively connect the first battery to a first load and a second load of the one or more loads; the second switch is configured to selectively connect the second battery to the first load and the second load; the third switch is configured to selectively connect the third battery to the first load and the second load; and the fourth switch is configured to selectively connect the third battery to the first load and the second load, separately from the third switch.

2. The electrical assembly of claim 1, wherein the one or more loads include first and second electric driving motors of a vehicle; and
the ECU is configured to selectively open one or more of the first switch, the second switch, the third switch, and the fourth switch of the switch assembly and disconnect a corresponding battery of the first battery, the second battery, and the third battery from the one or more loads to test the one or more switches and the corresponding battery while providing redundant power to said first and second electric driving motors to drive said vehicle.

3. The electrical assembly of claim 1, wherein the ECU is configured to receive and transmit information about a status of the switch assembly.

4. An electrical assembly, comprising:
an electronic control unit (ECU);
a first battery;
a second battery;
a third battery; and
a switch assembly;
wherein the switch assembly is configured to selectively connect at least two of the first battery, the second battery, and the third battery to one or more loads;
wherein the ECU is configured to control the switch assembly such that at least two of the first battery, the second battery, and the third battery are connected to said one or more loads at substantially all times;
wherein the switch assembly includes a first switch, a second switch, a third switch, and a fourth switch;
wherein the first switch is connected to a first load of said one or more loads;
the first switch is connected to a second load of said one or more loads via a secondary switch of the third switch; and
the ECU is configured to control the first switch and the secondary switch of the third switch to connect the first battery with said first load and said second load of the one or more loads.

5. The electrical assembly of claim 1, wherein the ECU is configured to test at least one of the first switch, the second switch, the third switch, and the fourth switch while at least two of the first battery, the second battery, and the third battery are connected to both of the first load and the second load of the one or more loads.

6. The electrical assembly of claim 1, wherein the electrical assembly includes a first state configured for testing the first switch of the switch assembly, a second state configured for testing the second switch of the switch assembly, and a third state for testing either or both of the third switch and the fourth switch of the switch assembly.

7. The electrical assembly of claim 1, wherein the first battery is configured for connection with said first load and said second load of said one or more loads via the first switch and a secondary switch of the third switch;
the second battery is configured for connection with said first load and said second load via the second switch and a secondary switch of the fourth switch; and
the third battery is configured for connection with said first load and said second load via the third switch, the fourth switch, a secondary switch of the first switch, and a secondary switch of the second switch.

8. A vehicle, comprising:
the electrical assembly of claim 1; and
the one or more loads;
wherein the first load and the second load include redundant loads.

9. The vehicle of claim 8, wherein the first load and the second load of said one or more loads are configured as highly automated driving (HAD) loads.

10. A method of operating the electrical assembly of claim 1, the method comprising:
providing power from at least two of the first battery, the second battery, and the third battery to said one or more loads; and
selectively opening and closing the first switch, the second switch, the third switch, and the fourth switch, while providing power to said one or more loads, to test the first switch, the second switch, the third switch, the fourth switch, the first battery, the second battery, and the third battery;
wherein at least two of the first battery, the second battery, and the third battery are connected to each of said one or more loads during the selectively opening and closing.

11. The method of claim 10, wherein selectively opening and closing the first switch, the second switch, the third switch, and the fourth switch includes:
opening the first switch to disconnect the first battery from said one or more loads;
closing the third switch and/or the fourth switch to connect the third battery to said one or more loads; and
testing the first switch to determine a status of the first switch.

12. The method of claim 11, wherein selectively opening and closing the first switch, the second switch, the third switch, and the fourth switch includes:
opening the second switch to disconnect the second battery from said one or more loads;
closing the third switch and/or the fourth switch to connect the third battery to said one or more loads; and testing the second switch to determine a status of the second switch.

13. The method of claim 12, wherein selectively opening and closing the first switch, the second switch, the third switch, and the fourth switch includes:
   opening the third switch and/or the fourth switch;
   closing the first switch and the second switch to connect the first battery and the second battery to said one or more loads; and
   testing the third switch and/or the fourth switch to determine a status of the third switch and/or the fourth switch.

14. The electrical assembly of claim 4, wherein the first switch is connected to the first battery, the second switch is connected to the second battery, and the third switch and the fourth switch are connected to separately provide power from the third battery to the one or more loads.

15. The electrical assembly of claim 4, wherein the second switch is configured to selectively connect the second battery to the first load and the second load; the third switch is configured to selectively connect the third battery to the first load and the second load; and the fourth switch is configured to selectively connect the third battery to the first load and the second load, separately from the third switch.

16. An electrical assembly, comprising:
   an electronic control unit (ECU);
   a first battery;
   a second battery;
   a third battery; and
   a switch assembly;
   wherein the switch assembly is configured to selectively connect at least two of the first battery, the second battery, and the third battery to one or more loads;
   the ECU is configured to control the switch assembly such that at least two of the first battery, the second battery, and the third battery are connected to said one or more loads at substantially all times;
   the electrical assembly includes a first state configured for testing a first switch of the switch assembly, a second state configured for testing a second switch of the switch assembly, and a third state for testing either or both of a third switch and a fourth switch of the switch assembly;
   the third state corresponds to normal operation;
   the third switch and the fourth switch are both connected to the third battery; and
   in the first state, the third switch is closed and the fourth switch is open.

17. A vehicle, comprising:
   the electrical assembly of claim 4; and
   the one or more loads;
   wherein the one or more loads includes two redundant loads.

18. The electrical assembly of claim 4, wherein the ECU is configured to receive and transmit information about a status of the switch assembly.

19. A vehicle, comprising:
   the electrical assembly of claim 16; and
   the one or more loads;
   wherein the one or more loads includes two redundant loads.

20. The electrical assembly of claim 16, wherein the ECU is configured to receive and transmit information about a status of the switch assembly.

* * * * *